1

US007936352B2

(12) United States Patent
Baran et al.

(10) Patent No.: US 7,936,352 B2
(45) Date of Patent: May 3, 2011

(54) DEFORMATION OF A COMPUTER-GENERATED MODEL

(75) Inventors: Ilya Baran, Cambridge, MA (US); Scott Harris, Acton, MA (US); Lana Saksonov, Andover, MA (US); Saul Rothstein, Holliston, MA (US); Robert Zuffante, Concord, MA (US)

(73) Assignee: Dassault Systemes SolidWorks Corporation, Concord, MA (US)

( * ) Notice: Subject to any disclaimer, the term of this patent is extended or adjusted under 35 U.S.C. 154(b) by 649 days.

(21) Appl. No.: 11/181,964

(22) Filed: Jul. 14, 2005

(65) Prior Publication Data

US 2006/0017723 A1    Jan. 26, 2006

(51) Int. Cl.
*G06T 17/00*    (2006.01)
*G06T 15/30*    (2006.01)
*G09G 5/00*    (2006.01)

(52) U.S. Cl. ......... 345/420; 345/423; 345/616; 345/646
(58) Field of Classification Search .................. 345/420, 345/646, 423, 616
See application file for complete search history.

(56) References Cited

U.S. PATENT DOCUMENTS

| 4,890,242 | A | * | 12/1989 | Sinha et al. ............... 345/419 |
| 5,818,452 | A | * | 10/1998 | Atkinson et al. ........... 345/420 |
| 5,886,702 | A | * | 3/1999 | Migdal et al. .............. 345/423 |
| 5,995,107 | A | * | 11/1999 | Berteig et al. ............. 345/420 |
| 6,034,695 | A | * | 3/2000 | Silva et al. ................ 345/619 |
| 6,061,067 | A | * | 5/2000 | Silva et al. ................ 345/619 |
| 6,184,901 | B1 | * | 2/2001 | Silva et al. ................ 345/474 |
| 6,195,098 | B1 | * | 2/2001 | Brittain et al. ............. 345/422 |
| 6,369,815 | B1 | * | 4/2002 | Celniker et al. ........... 345/420 |
| 6,650,339 | B1 | * | 11/2003 | Silva et al. ................ 345/619 |
| 6,714,194 | B1 | * | 3/2004 | Sander ..................... 345/420 |
| 6,762,757 | B1 | * | 7/2004 | Sander et al. ............. 345/420 |

(Continued)

FOREIGN PATENT DOCUMENTS

JP    07-262398    10/1995

(Continued)

OTHER PUBLICATIONS

SolidWorks 2003 slashes design time, improves accuracy, and brings products to market faster. SolidWorks Press Release. Sep. 18, 2002. http://www.solidworks.com/pages/news/pressreleases/viewrelease.html?prid=85.*

(Continued)

*Primary Examiner* — Kee M Tung
*Assistant Examiner* — Robert Craddock
(74) *Attorney, Agent, or Firm* — Hamilton, Brook, Smith & Reynolds, P.C.

(57) ABSTRACT

Deforming a three-dimensional computer-generated model to cause a change of shape of the three-dimensional model includes representing a surface of the model using a surface representation initially comprised of an original surface definition, deriving smooth three-dimensional mapping functions where each mapping function defines a deformation to the surface and at least one mapping function is non-affine, constructing a composition of the mapping functions and the original surface definition where each mapping function is included in the composition in succession in accordance with the order of derivation, and applying the composition after each successive mapping function is included in the composition causing the surface of the three-dimensional model to be deformed while preserving the smoothness to the lowest degree of smoothness of the mapping functions.

21 Claims, 9 Drawing Sheets

U.S. PATENT DOCUMENTS

| | | | |
|---|---|---|---|
| 6,768,486 B1 * | 7/2004 | Szabo et al. | 345/420 |
| 6,941,251 B1 | 9/2005 | Stallings et al. | 703/2 |
| 7,173,623 B2 * | 2/2007 | Calkins et al. | 345/473 |
| 7,233,326 B1 * | 6/2007 | Silva et al. | 345/419 |
| 7,262,775 B2 * | 8/2007 | Calkins et al. | 345/473 |
| 7,318,203 B2 * | 1/2008 | Purves et al. | 715/853 |
| 2002/0075283 A1 | 6/2002 | Payne | |
| 2005/0248562 A1 * | 11/2005 | Maystrovsky et al. | 345/419 |

FOREIGN PATENT DOCUMENTS

| | | |
|---|---|---|
| JP | 10-283469 | 10/1998 |
| JP | 11045332 | 2/1999 |
| JP | 2001-325614 | 11/2001 |
| JP | 2003-281568 | 10/2003 |
| JP | 2004-078309 | 3/2004 |

OTHER PUBLICATIONS

SolidWorks 2004 unleashes designer, engineer creativity, accelerating key design functions by as many as 15 times. SolidWorks Press Release. Jul. 7, 2003.http://www.solidworks.com/pages/news/pressreleases/viewrelease.html?prid=138.*

SolidWorks 2005 delivers new features to make design engineers faster, more accurate, and more productive. SolidWorks Press Release. Jun. 9, 2004. http://www.solidworks.com/pages/news/pressreleases/viewrelease.html?prid=203.*

Review of Solidworks 2005. CAD-Reviews.com. Aug. 10, 2004. http://www.cad-reviews.com/20040810-solidworks2005-review-1.html.*

Gabriel et al. CLOS: Integrating Object-Oriented and Functional Programming. May 3, 2004.*

Gabriel et al. CLOS: Integrating Object-Oriented and Functional Programming. Communications of the ACM. vol. 34. Issue 9. 1991.*

Angelidis, A., et al., "Sweepers: Swept User-Defined Tools for Modeling by Deformation," Proceedings of the Shape Modeling International, 2004.

"The Manuel of New Functions of SolidWorks," Hitachi, Ltd., Nov. 30, 2003, $5^{th}$ Edition, pp. 2-4.

Japanese Office Action, received in Japanese Patent Application No. 2005-211679, mailing date Jun. 27, 2008.

European Search Report, EP Application No. 05291527.9; dated Sep. 8, 2005.

* cited by examiner

DEFORMATION OF A COMPUTER-GENERATED MODEL

BACKGROUND OF THE INVENTION

Computer-aided design (CAD) software allows a user to construct and manipulate complex three-dimensional (3D) models. A number of different modeling techniques can be used to create a 3D model. These techniques include solid modeling, wire-frame modeling, and surface modeling. Solid modeling techniques provide for topological 3D models, where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. Wire-frame modeling techniques, on the other hand, can be used to represent a model as a collection of simple 3D lines, whereas surface modeling can be used to represent a model as a collection of exterior surfaces. CAD systems may combine these and other modeling techniques, such as parametric modeling techniques. Parametric modeling techniques can be used to define various parameters for different features and components of a model, and to define relationships between those features and components based on relationships between the various parameters.

Surfaces are represented in CAD systems using several techniques. The techniques include the definition of surfaces as parametric surfaces, mesh surfaces, subdivision surfaces, and implicit surfaces.

A parametric surface is a deformation of a parameter space, typically that space is rectangular. Computer-aided modeling software commonly uses low-degree algebraic deformations, resulting in various spline and quadric surfaces. For some types of parametric surfaces, a set of control points defines the surface shape.

A mesh surface, also referred to as a tessellated surface, is a connected set of polygons, which are often triangular polygons. A mesh surface cannot represent a smooth surface exactly. However, certain basic operations applied to mesh surfaces are easy to implement and efficient to execute. Such basic operations include computing a bounding box and intersecting a mesh surface with one or more simple objects.

A subdivision surface is defined as the limit of a sequence of meshes. Each mesh in such a sequence is obtained by subdividing the previous mesh in the sequence according to one of several subdivision methods, which are know by those who are skilled in the art. An initial control mesh (i.e., the first mesh in the sequence) is thus sufficient to specify the subdivision surface. Although the initial control mesh is not smooth, the resulting subdivision surface is smooth, and the degree of smoothness of the resulting subdivision surface depends on the subdivision method chosen. If desired, the subdivision method can be adjusted to ensure that certain edges remain sharp.

An implicit surface is defined as the set of points that satisfy the expression $F(x, y, z)=0$. If F is a smooth function, the surface will usually be smooth. Spheres, tori, and ellipsoids are some of the surfaces that can be represented as implicit surfaces.

In general, state-of-the-art computer graphics hardware is optimized to render mesh surface representations, and therefore, some surface representations are routinely converted to mesh surfaces for rendering. Approximating a parametric surface with a mesh is generally straightforward because a mesh can be constructed on the parametric space and a deformation of the surface can be evaluated on the mesh vertices. Converting a subdivision surface to a mesh is also generally straightforward, since the sequence of meshes converges to the subdivision surface very quickly. Approximating an implicit surface with a mesh is generally difficult; however, methods have been developed to approximate an implicit surface.

To deform a spline or a subdivision surface, the surface control mesh is modified. The coarser the control mesh is, the more limited is the ability to control modifications to the surface. However, a finer control mesh (which may be necessary to produce small features), increases the size of the control mesh, and therefore, requires more memory to store the surface and a greater number of computations to transform the surface.

Another deformation approach is to deform the space in which the surface is located. Typically, the 3D space is tessellated into a cubic mesh and the cubic mesh is deformed. Based on the deformed mesh, a deformation is computed for the entire space and applied to the surface, as described in an article titled "A Framework for Geometric Warps and Deformations" by Tim Milliron et al., ACM Transactions on Graphics, Vol. 21, No. 1, January 2002, pp. 20-51. The deformation may be constrained to only affect a portion of the entire space, as described in an article titled "General Constrained Deformations Based on Generalized Metaballs" by Xiaogang Jin et al., Pacific Conference on Computer Graphics and Applications 1998, pp. 115-124.

One drawback of defining a space deformation is that deforming the space in which the surface is located is not intuitive because the objective is to deform the surface not the space in which the surface resides. Additionally, if the space deformation is applied to vertices of a mesh, sharp edges of the mesh may be exaggerated because the angles between adjacent polygons may increase. Applying the space deformation to the mesh polygons may require reapproximating the result by another mesh. Reapproximating the result with a refinement of the original mesh often leads to a deterioration of the polygon aspect ratios. Furthermore, if the space deformation is applied to a spline, converting the resulting surface back into a spline may be computationally costly and the smoothness of the surface may not be maintained. Generally, the smoothness constraints between surface patches can be maintained only approximately.

Many commercially available 3D CAD systems have free-form surface manipulation capabilities. Such capabilities are usually constrained by representing the surfaces internally as non-uniform rational b-spline (NURBS) surfaces. Thus, manipulation controls are often restricted to particular points or curves of the surfaces. The user, therefore, is limited in his or her ability to form a desired shape. Some systems can allow an arbitrary point or curve as a manipulation control. For example, the SolidWorks® 2004 software product, available from SolidWorks Corporation of Concord, Mass., enables one or more surfaces to be deformed using an arbitrary point or curve as a manipulation control. Then, resulting surfaces are approximated with NURBS surface patches. Achieving the desired accuracy of shape and smoothness between surface patches, in general, leads to high density control grids and makes such surfaces computationally expensive for subsequent operations.

Many users of 3D CAD systems are skilled in 3D modeling techniques and design 3D models professionally. These experienced users understand how to manipulate control points and meshes used to define a surface, and how to manipulate vertices and edges that are surface entities. A 3D CAD system that provides a simple and intuitive means to create and modify the shape of 3D models of various complexities would be advantageous for those not skilled in 3D modeling techniques as well as for those that are. A 3D CAD system that allows users to interactively deform complex models by direct manipulation of an arbitrary point, curve, or surface area, while preserving the smoothness of the surface throughout the model, could enable users to create smooth shapes in a natural, fast, and simple way, and thereby enhance the capabilities and ease of use of a 3D CAD system.

SUMMARY OF THE INVENTION

In general, in one aspect, the invention features a computer-implemented method for deforming a three-dimensional computer-generated model. The method includes representing a surface of the three-dimensional model using a surface representation that includes an original surface definition. Smooth three-dimensional mapping functions that define a deformation to the surface are derived, where at least one of the three-dimensional mapping functions is non-affine. A composition of the three-dimensional mapping functions and the original surface definition is constructed, where each of the mapping functions is included in the composition in succession. Moreover, the mapping functions are ordered in the composition in the order in which the mapping functions were derived. The composition is applied after each successive three-dimensional mapping function is included in the composition, causing the surface of the three-dimensional model to be deformed while preserving smoothness to the lowest degree of smoothness of the mapping functions.

Implementations may include defining the surface as a parametric surface, a mesh surface, or a subdivision surface, and using the chain rule to determine a derivative of the surface representation.

A user interface that includes depictions of deformation results can be displayed by some implementations and one depiction can be selected to indicate a deformation operation that is implemented as a mapping function. The deformation operation can allow for a curve, a point, or an area of the surface to be pulled. Additionally, the deformation operation can impress a sphere or a curve upon the surface, or narrow, flatten, or twist the surface.

Implementations may also include one or more of the following features. A deformation control that is positioned with respect to the surface of the model can be identified, transformed, and utilized as a parameter to the mapping function. The deformation control can be a lower-order geometry, and can be a point, a curve, a plane, a line, an axis, an area of a surface, or a parabolic object.

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

The present invention facilitates smooth real-time deformations of freeform surfaces by utilizing arbitrary lower-order geometry and other deformation controls to directly manipulate one or more surfaces. Such arbitrary lower-order geometry includes, by way of non-limiting example, points, curves, planes, axes, and surfaces. Moreover, the present invention preserves the existing smoothness of the surfaces and existing surface curvature characteristics. A sequence of smooth space mappings is used to change the shape of a model without a loss in model accuracy. Furthermore, a user interface provides users with a natural, fast, and simple approach to deforming freeform surfaces. The user interface affords access to a functional library that supports the direct interactive manipulation of one or more surfaces. Due to the foregoing, the present invention enhances the capabilities of a computerized modeling system.

Figure 1:
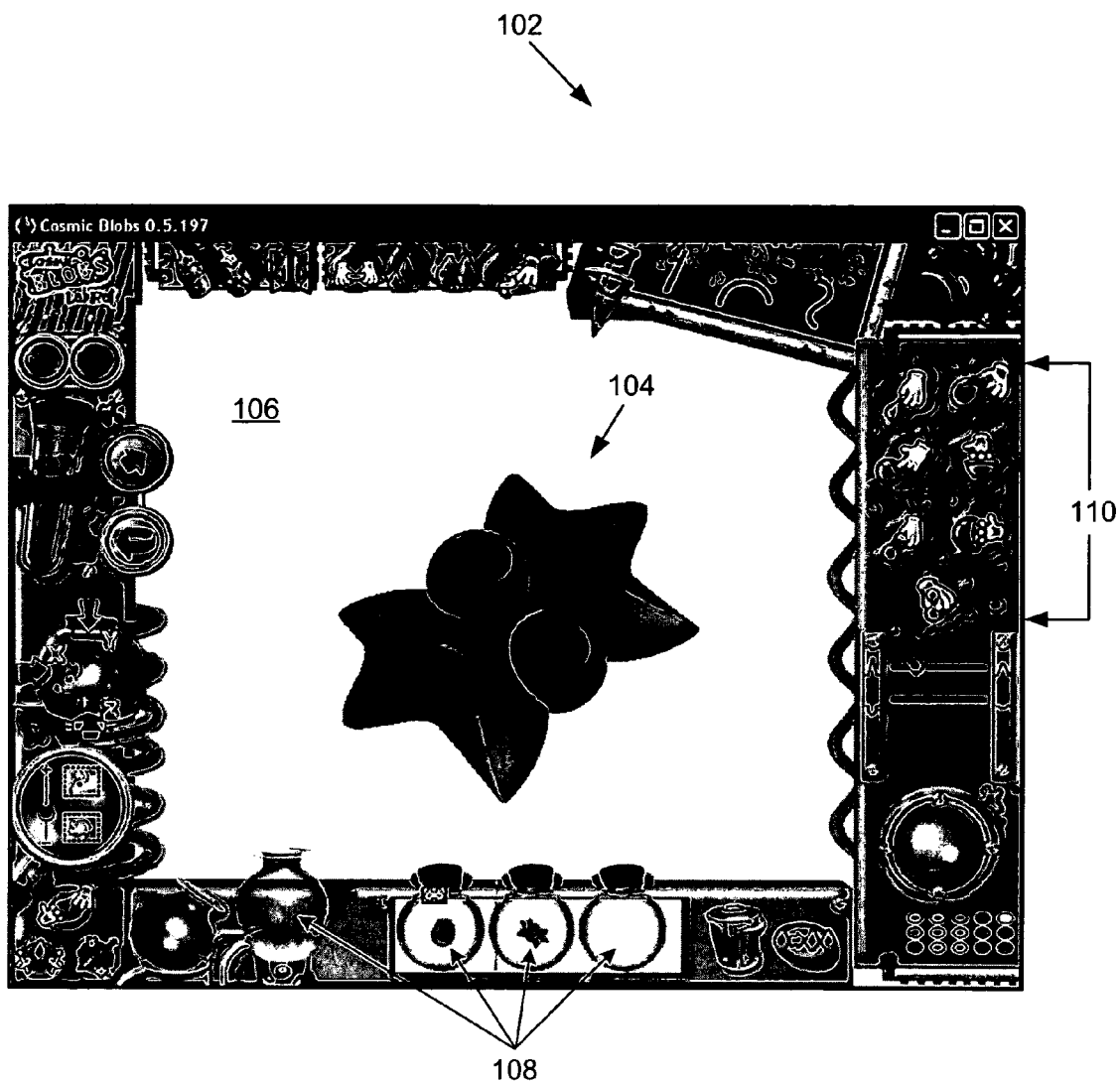
FIG. 1 is an illustration of a computer-generated model displayed in a window.

FIG. 1 shows a window 102 displayed on a CRT and generated by modeling software executed by a computerized modeling system, an example of which is later shown with reference to FIG. 9. The window 102 is a conventional computer-generated window that can be programmed by one of ordinary skill in the art using conventional, commercially available, software programming tools, such as those available from Microsoft Corporation of Redmond, Wash.

A computer-generated 3D model 104 is displayed within a modeling portion 106 of the window 102. The surfaces of the 3D model 104 can be displayed, or the 3D model 104 can be displayed using solid lines and dashed lines to show visible edges and hidden edges, respectively, of the 3D model. Implementations also may include other window areas. A set of file icons 108 aids the user in the selection of various files that may be used as a base model, such as a sphere primitive. A set of deformation icons 110 enables a user to manipulate the model 104 shown in the modeling portion 106 of the window 102.

Figure 2:
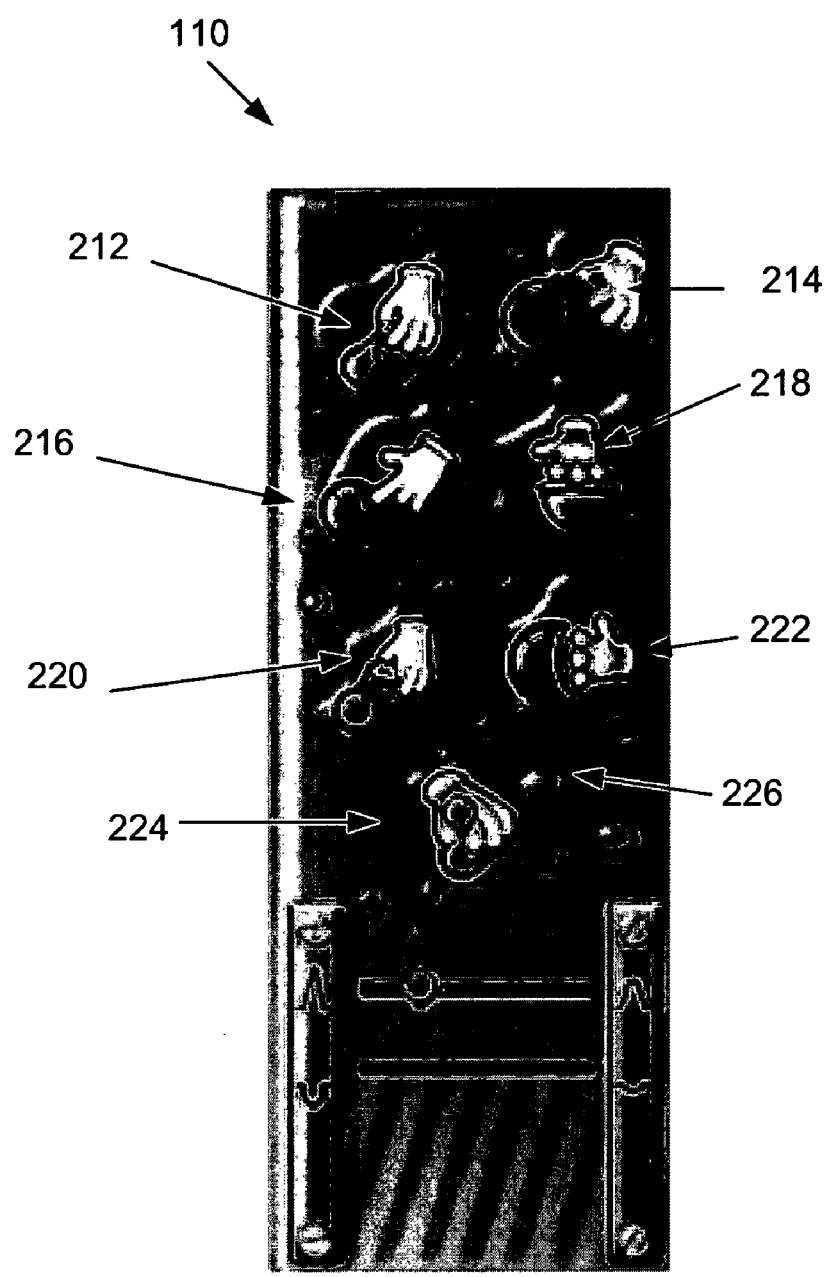
FIG. 2 is an illustration of a set of icons.

FIG. 2 shows the set of deformation icons 110. Each of the deformation icons 110 depicts a deformation result and when selected indicates to the modeling software that a particular function is to be applied to a local region of a model. Three such functions enable a point on a surface, a curve on a surface, and an area of a surface to be pulled, and are activated by selecting a point pull icon 212, curve pull icon 214, and an area pull icon 220, respectively. When a curve, a point, or an area is pulled the surface is modified in real time. Thus, the pulling action and resulting modification caused by the pulling action is interactive. Another function enables a spherical indentation to be impressed upon a surface and is activated when a poke sphere icon 216 and a center point for the sphere with respect to a model are selected. Still another function causes a surface to narrow at a specific location and is activated when a create neck icon 224 is selected, after which a plane is displayed and positioned such that the narrowing occurs in a direction towards the plane. An arbitrary point on the plane is also indicated to designate the center of the narrowing affect. A flatten surface icon 218, when selected, causes a surface to be flattened after a plane is positioned where the surface is to be flattened. A curve imprint icon 222, when selected, causes a curve to be impressed upon a surface. As is the case with the pulling functions, all other functions are applied to a model in real time, and therefore, the deformations that result occur interactively.

Figure 3:
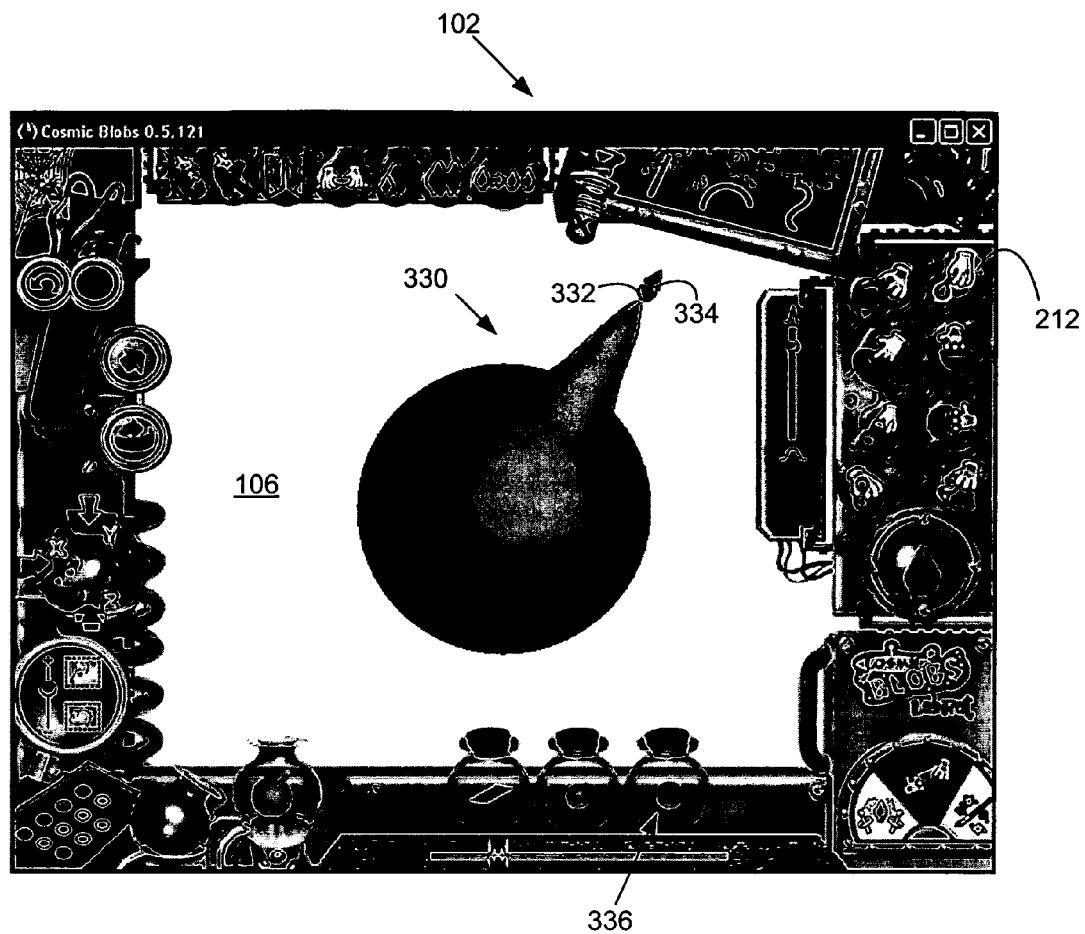
FIG. 3 is an illustration of a deformed 3D model.

FIG. 3 is an illustration of a 3D model 330 deformed by directly manipulating an arbitrary point 332 (attached to a cursor object 334) positioned on the circumference of what was initially a sphere. The initial sphere can be displayed after selecting file icon 336. To deform the 3D model 330 as is shown in FIG. 3, a user first selects the point pull deformation icon 212 then selects the arbitrary point 332. The user can interactively move the arbitrary point 332 using a pointing device (e.g., a mouse). In response to the movement of the arbitrary point 332, the 3D model 330 is deformed in real time.

Figure 4:
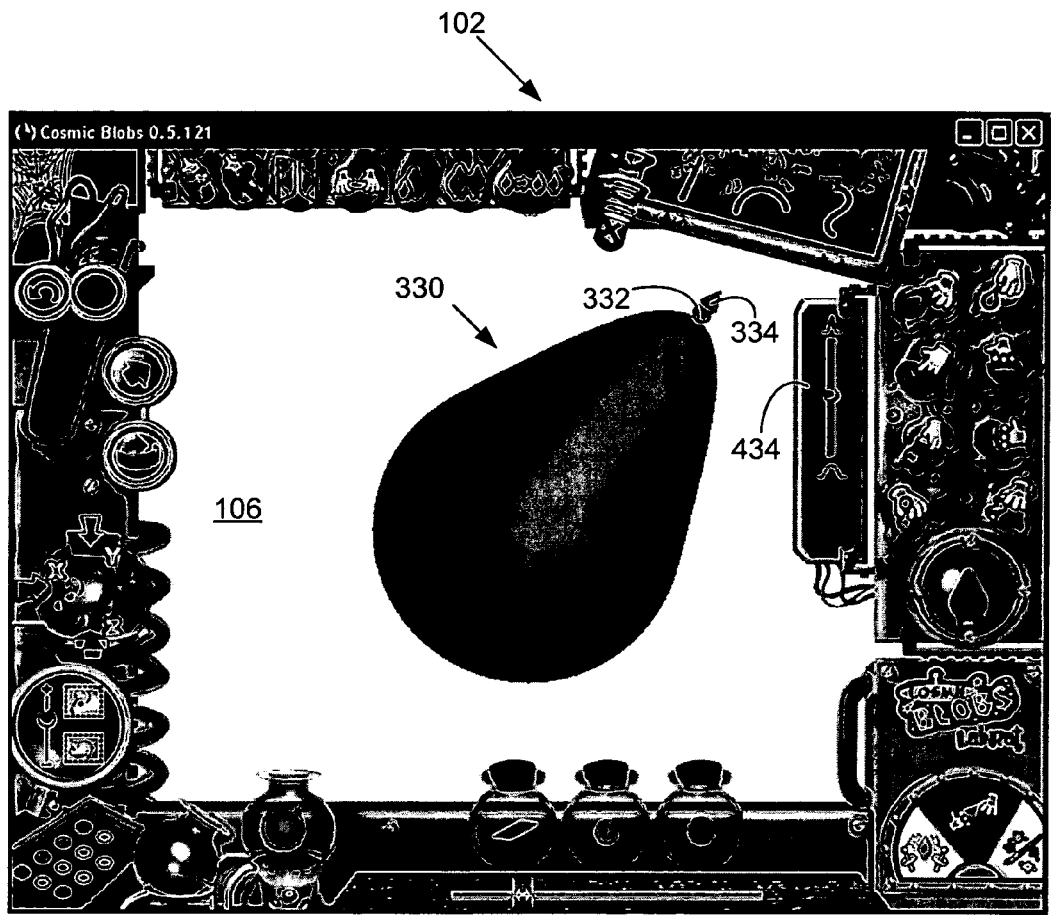
FIG. 4 is an illustration of a deformed 3D model.

FIG. 4 shows a smooth deformation of the 3D model 330 after the direct manipulation of the arbitrary point 332, which is attached to the cursor object 334. In FIG. 4, the 3D model 330 takes on a different appearance than that in FIG. 3 because a larger area on the surface of the 3D model 330 is influenced by the displacement of the arbitrary point 332. A user interface control, slider 434, is used to increase and decrease the area of influence. When the slider 434 is moved toward the bottom of the window 102, a larger portion of the model is subsumed in the area of influence; whereas, when the slider 434 is moved toward the top of the window 102, a smaller portion of the model is subsumed in the area of influence.

Figure 5A:
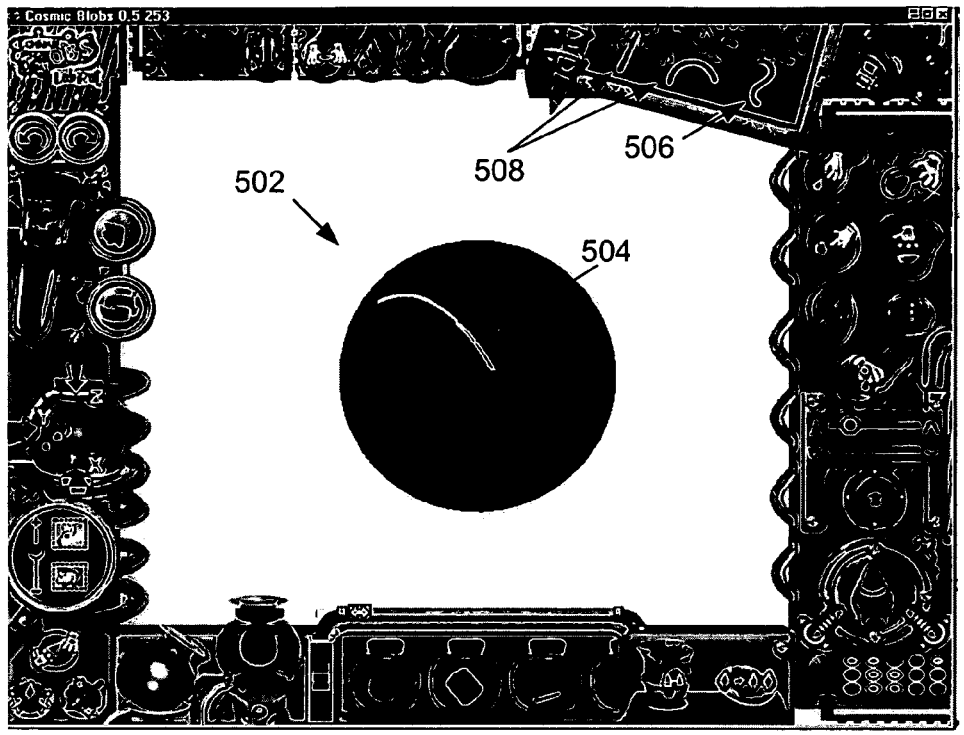
FIG. 5A is an illustration of a curve on a 3D model.
Figure 5B:
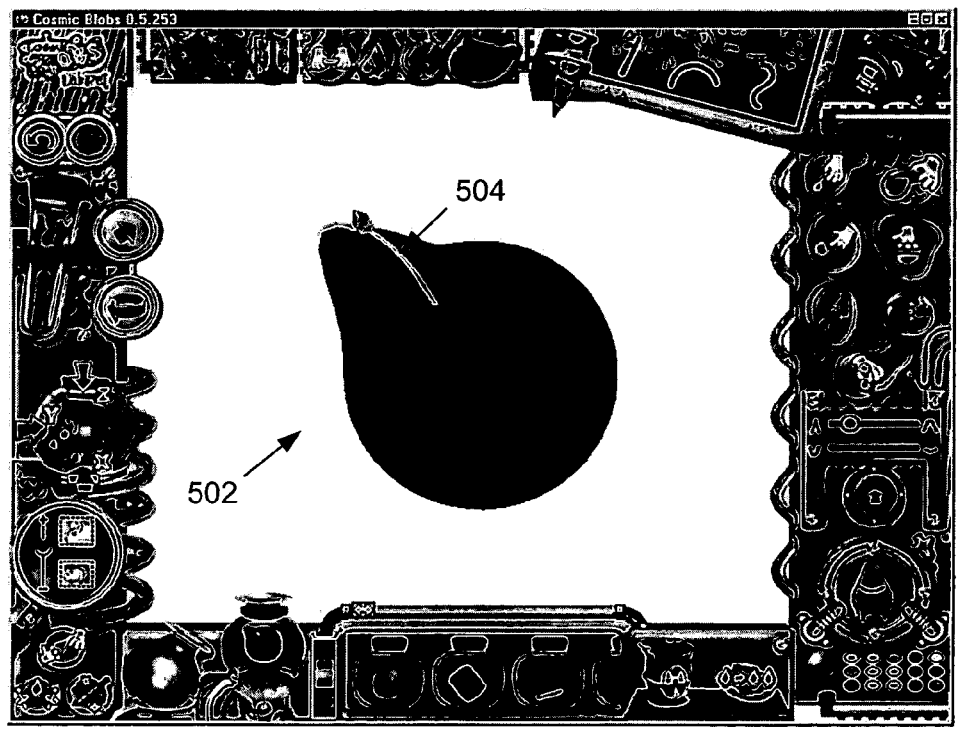
FIG. 5B is an illustration of a deformed 3D model.

FIGS. 5A and 5B illustrate the deformation of a 3D model 502 by manipulating an arbitrary curve 504 drawn on the 3D model 502. As is the case when a 3D model is deformed via direct manipulation of an arbitrary point, the deformation that results from the direct manipulation of an arbitrary curve is a localized deformation. A curve can be drawn on a model after the curve symbol 506 is chosen from the user interface. Other symbols 508 may be chosen from the user interface that enable a straight line and an arc to be drawn on the model and then be used to directly manipulate the model. FIG. 5B illustrates the 3D model 502 after the curve 504 is pulled using a pointing device. As shown in FIG. 5B, the transformation of the curve 504 extrudes the surface. The orientation of the 3D model 502 differs in FIGS. 5A and 5B because the curve 504 used to deform the 3D model 502 and the deformation of the 3D model 502 are viewed more advantageously from different viewpoints.

Figure 6A:
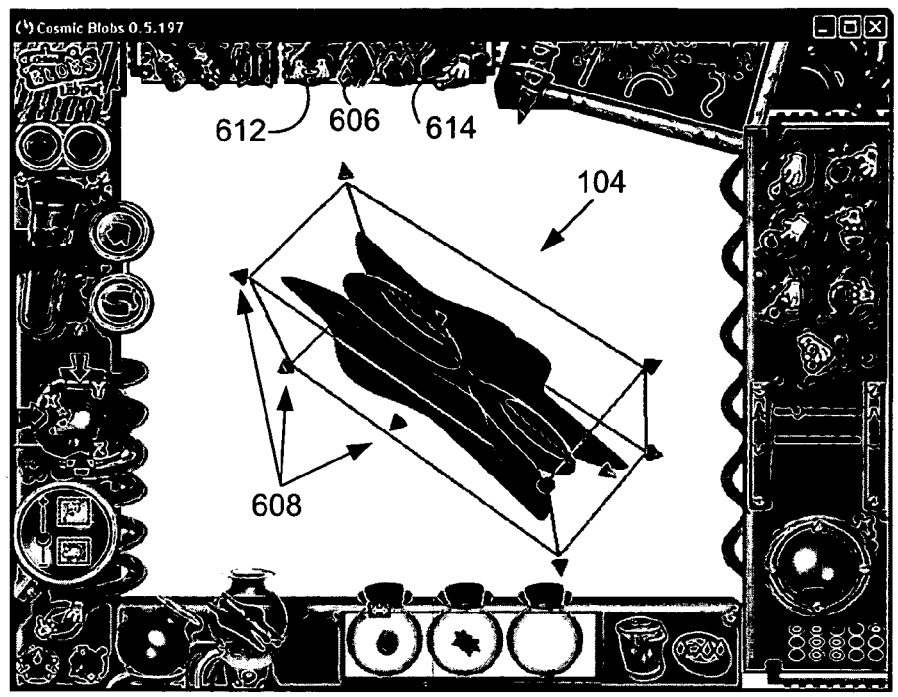
FIG. 6A is an illustration of a deformed 3D model.
Figure 6B:
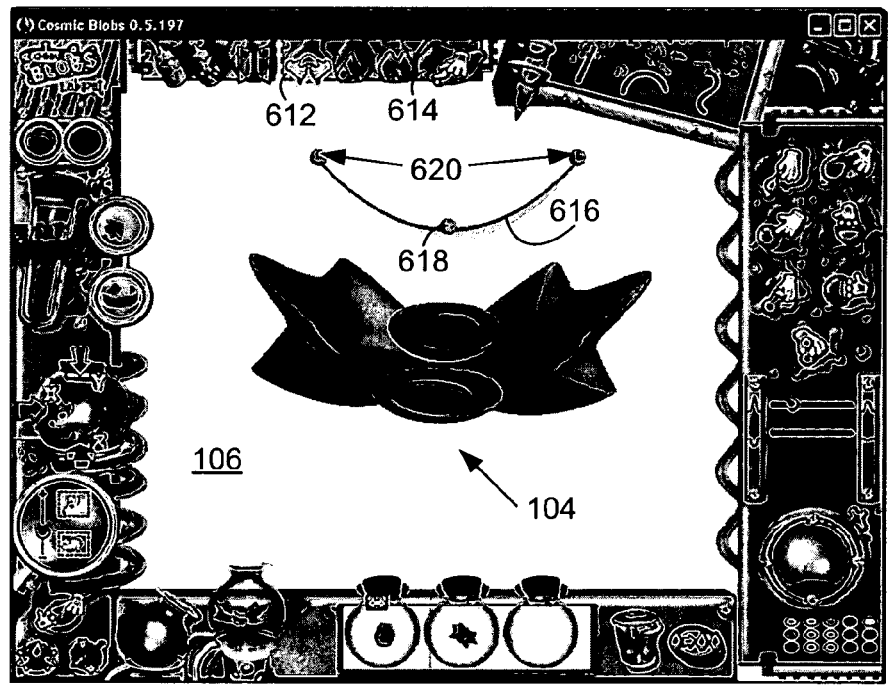
FIG. 6B is an illustration of a deformed 3D model.

FIGS. 6A and 6B illustrate global deformations being applied to model 104. In FIG. 6A, the global deformation is the result of an application of a scale function. The scale function is activated after the scale icon 606 is selected from the user interface, after which a three-dimensional enclosure is drawn around the model 104. A corner or a face of the enclosure can be moved to change the size or the shape of the enclosure and thereby cause a scale function to be applied to the model 104. Conic handles 608 are provided to control the movement of the enclosure.

Other functions that have a global affect on a model include a bend function and a twist function, which are activated when a bend icon 612 and a twist icon 614 are selected, respectively. FIG. 6B shows model 104 after a bend function has been applied to the model 104. After the bend icon 612 is selected, a parabolic object 616 is displayed in the modeling area 106. A pivot point 618 is designated on the parabolic object 616, as are leverage points 620. The pivot point 618 and the leverage points 620 can be moved using a pointing device. As the pivot point 618 or one of the leverage points 620 are moved, the parabolic object 616 bends and the model 104 is deformed by bending in the same manner as the parabolic object 616. When the twist icon 614 is selected, a rotational control and an axis is displayed to control the twisting motion.

Figure 7:
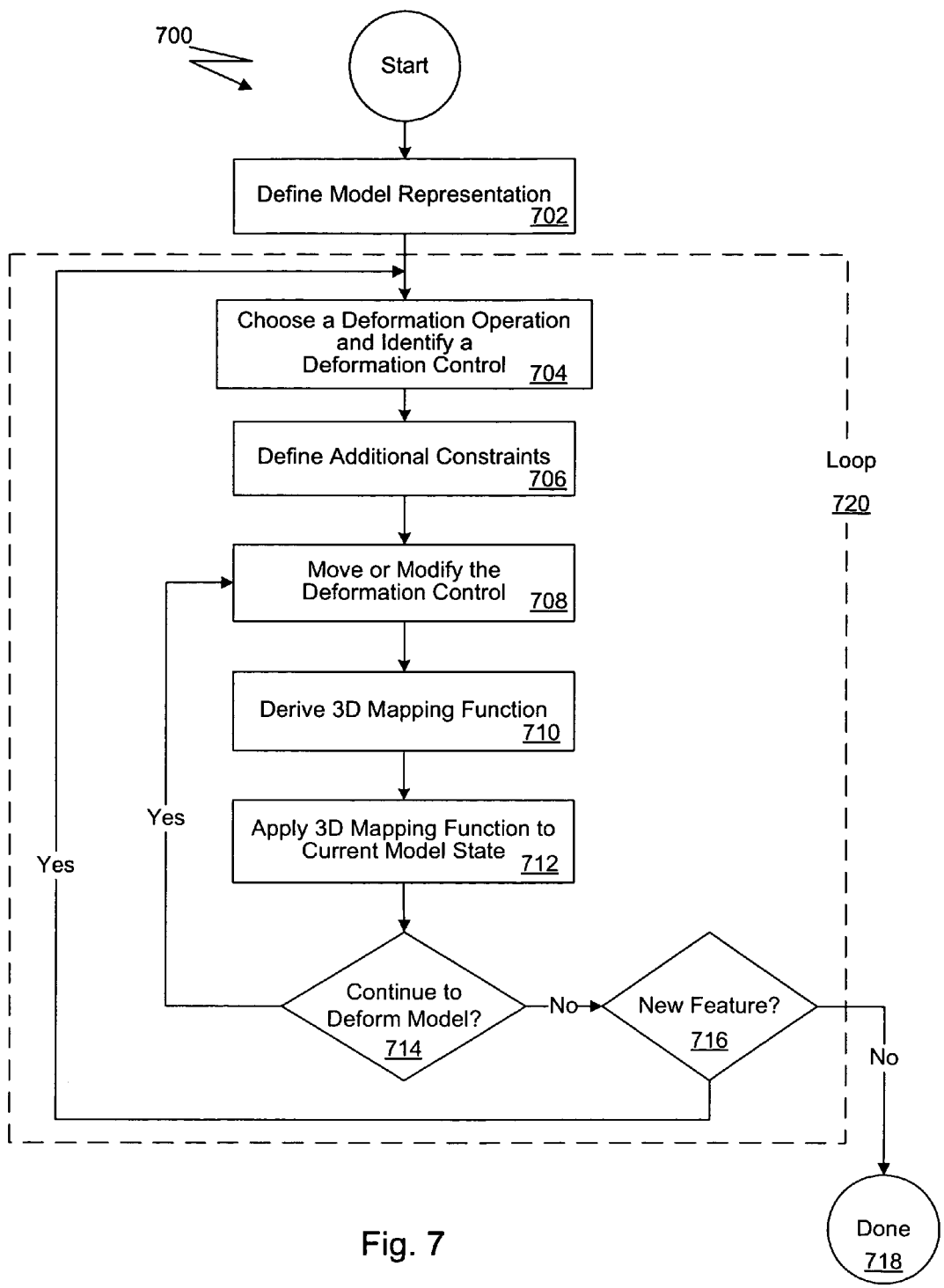
FIG. 7 is a flowchart of a procedure for directly manipulating a 3D model.

Referring now to FIG. 7, a procedure 700 for directly manipulating a 3D model is shown. First, a representation of the model is defined (step 702). The model representation may include any surface representations that can be evaluated, including parametric surfaces, mesh surfaces, and subdivision surfaces. In general, the present invention applies to any 3D representation of a model that can be evaluated.

In the next step, a deformation operation is chosen and a deformation control is identified (step 704). The deformation operation may be chosen by selecting one of the deformation icons 110 or one of the icons depicting global deformation operations, which were previously discussed with reference to FIG. 2, and FIGS. 6A and 6B, respectively. For example, the curve pull icon 214 shown in FIG. 2 can be selected to choose a deformation operation that deforms the model by applying a shape of a curve to the model, or the poke sphere icon 216 (also shown in FIG. 2) can be selected to choose a deformation operation that causes a spherical impression on one or more surfaces of the model. The deformation control can be any lower-order geometry. By way of non-limiting example, the identified deformation control may be a point, a curve, a plane, an axis, or an area of a surface, and can be identified by selecting a point, drawing a curve, positioning a plane, or specifying a surface region. The deformation control may also be an object used to apply a global deformation. In any case, the deformation control complements the chosen deformation operation. For example, pull operations can be controlled by a point, a curve, or an area of a surface; scale operations can be controlled by the conic handles of a rectangular frame (as shown in FIG. 6A); bend operations can be controlled by a pivot point and leverage points (as shown in FIG. 6B). In addition, some deformation controls may be implied by virtue of the nature of the chosen deformation operation.

In the next step, one or more additional constraints may be defined (step 706). One such additional constraint is a region of influence. When a region of influence is defined as a constraint, only the points within an area that surrounds the deformation control are affected by the deformation operation. By way of non-limiting example, the region of influence may be a three-dimensional region specified by a radius of a specified size surrounding a deformation control. Moreover, the size of the region of influence may be a system-defined size or a user-defined size. Another constraint may be an area constraint, and in this case, only a selected area will be affected by the deformation operation. The selected area can be indicated by drawing a contour that surrounds an area to be affected by a deformation.

Yet another constraint is a pattern constraint. A pattern constraint, when defined, replicates a deformation in a way required by a pattern, such as a rectangular, a circular, or a mirror pattern. In the case of a mirror pattern constraint, a mirror icon is chosen from the user interface causing a selected component to be symmetrically duplicated on an opposite side of a plane positioned by a user. Then, when one of the symmetrical components is deformed, a symmetrical deformation is applied to the other symmetrical component simultaneously.

Other additional constraints may include a half-space constraint or a space-band constraint. A half-space constraint limits the deformation operations to points positioned on one side of a specified plane. A space-band constraint limits the deformation operations to points positioned between two parallel planes.

In the next step, the deformation control is moved or modified (step 708). The deformation control may be moved by means of customary user interactions using a pointing device, such as a mouse, to drag the deformation control (e.g., a point, a curve, or an area of a surface) to a new location in the modeling area. The deformation control can also be modified. By way of non-limiting example, a deformation control that is initially a straight line can become curved, a deformation control that is a curve can change shape (e.g., bend), or a deformation control that is a boundary enclosing a region can expand, contract, or be modified in another way (e.g., skewed).

In some cases when a deformation control is moved or modified, a deformation target is produced. The deformation target represents the deformation control in a new location or represents the deformation control assuming a new shape. The deformation target is defined using the same representation as the deformation control. That is, if the deformation control is a point or a curve, the deformation target is represented as point or a curve, respectively.

The procedure 700 then derives a 3D mapping function from a functional library (step 710). The 3D mapping function, when applied to the 3D model, maps the deformation control to the deformation target, if applicable, while considering the additional constraints defined in step 706. If the 3D mapping function is smooth, the 3D mapping function automatically preserves the degree of smoothness in and between the surfaces in the model. For example, $C^2$ mapping preserves $C^2$ continuity within and between surfaces.

A series of 3D mapping functions derived in step 710, one per each cycle of loop 720, determine the deformed shape of the one or more surfaces being manipulated. The internal representation of the model is maintained as a collection of warp surfaces, where a warp surface as implemented by the present invention is a sequence of smooth 3D mapping functions applied to the original surface definition. Rather than have each deformation redefine the initial definition of a surface of the model, a sequence of smooth 3D mapping functions and an original surface definition are stored and associated with one another. Each smooth 3D mapping function derived in step 710 per cycle of loop 720 represents one deformation in the sequence.

One advantage of utilizing warp surfaces is that any parametric surface can be used as the original surface without conversion. Applying the same sequence of 3D mappings to a collection of parametric surfaces, such as a B-rep surface (i.e., a boundary-representation surface), typically preserves both the topology of the collection of parametric surfaces and the continuity relationships between the parametric faces. Another advantage of utilizing warp surfaces is that no approximation is necessary for the operations, and therefore, precision is maintained as the surface is manipulated. Implementations may benefit from display and query optimizations by using a mesh approximation to the warp surface; however, this approximation is not incorporated into the surface representation. Another advantage of utilizing warp surfaces is that because a precise evaluator (i.e., a method for computing a value of a function and the derivatives thereof) for the surface is available, warp surfaces have all of the advantages of parametric surfaces (e.g., the existence of methods for approximating the surface with a mesh and for various geometric operations). A further advantage of warp surfaces is that relatively little computation is necessary to update the model state with a new deformation, so the model can be manipulated interactively. Another advantage of warp surfaces is that each deformation can be described with a small number of parameters, resulting in a concise representation for the entire model with regards to disk storage space.

In the next step of procedure 700, the 3D mapping function is applied to the current model state (step 712), where the current model state is the original representation of the model having all transformations (i.e., 3D mapping functions) applied thus far. For example, if the model representation is defined as a polygonal mesh, the model state is produced by applying the sequence of transformations to the vertices of the polygonal mesh. To increase the accuracy of the mesh approximation of the deformed model, in the areas of higher curvature, the density of the polygonal mesh can be increased automatically.

The procedure 700 then determines whether to continue to deform the model using the identified deformation control, selected deformation operation, and defined constraints (step 714). The determination to continue may occur when further input is received to move or modify the deformation control. In the case when the determination to continue occurs, the most recent 3D mapping operation derived will be replaced by a subsequently derived 3D mapping function.

When the deformation to the model using the identified deformation control, chosen deformation operation, and defined constraints is complete, the procedure 700 then determines whether to apply a new feature to the model (step 716). If a new feature is to be applied to the model, another deformation operation may be chosen and another deformation control may be identified (step 704), and/or additional constraints may be defined (step 706). The deformation control is then moved or modified (step 708). Then, a new 3D mapping function is derived (step 710) and applied to the current model state (step 712), which now includes the previously derived 3D mapping function. The new 3D mapping function will become another transformation in the sequence of transformations used to re-define the model and will be replaced by a subsequently derived 3D mapping functions until the determination is made not to continue to deform the model using the then identified deformation control, selected deformation operation, and defined constraints. When the procedure 700 determines that no new features will be applied to the model (in step 716), procedure 700 completes (step 718).

In one embodiment, the deformed model can be presented to the user for preview purposes. In such an embodiment, a preview step occurs immediately after a determination is made not to continue to deform the model (i.e., after step 714 and prior to step 716). The preview step displays a user interface dialog box that queries the user whether the deformation should be accepted. The user then has the opportunity to accept the deformation by pressing an accept button in the dialog box, in which case, the last 3D mapping function that was derived is added to the warp surface sequence of 3D mapping functions. If the user presses a reject button displayed in the dialog box, the last 3D mapping function that was derived is not added to the warp surface sequence of 3D mapping functions.

Figure 8:
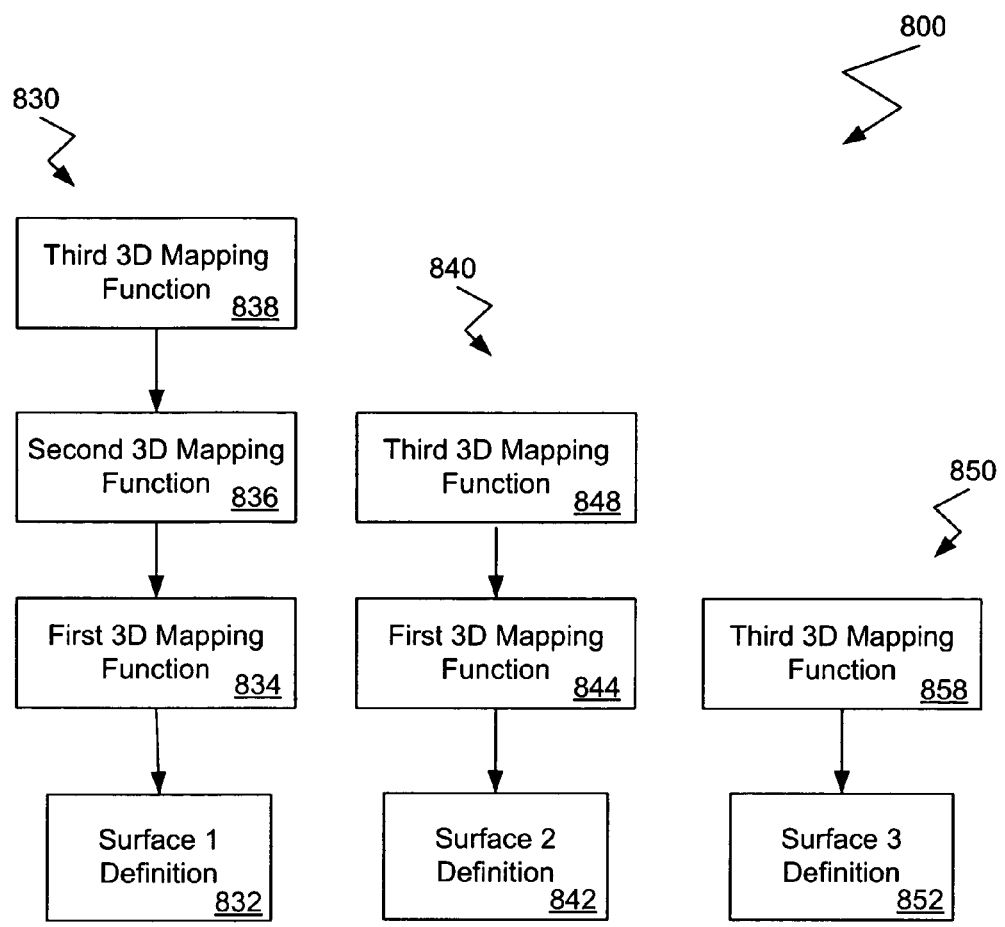
FIG. 8 is an illustration of a data structure.

Referring now to FIG. 8, an illustration of a data structure 800 of a model that may be used by the present invention is shown. The data structure 800 is an abstract representation of a model defined by three warp surfaces 830, 840, and 850. The three surfaces are stored as surface 1 definition 832, surface 2 definition 842, and surface 3 definition 852. Three 3D mapping functions, which were derived in step 710 of FIG. 7, apply to one or more of the three surfaces. One 3D mapping function applies to surface 1 definition 832 and surface 2 definition 842, and is stored in the data structure 800 twice as first 3D mapping function 834 and first 3D mapping function 844. A second 3D mapping function 836 only applies to surface 1 definition 832 and is stored in the data structure 800 associated with surface 1 definition 832. A third 3D mapping function applies to surface 1 definition 832, surface 2 definition 842, and surface 3 definition 852, and is stored in the data structure 800 as third 3D mapping function 838, third 3D mapping function 848, and third 3D mapping function 858.

The 3D mapping functions that are derived in step 710 and illustrated in FIG. 8 define a particular deformation to be applied. Those skilled in the art can design a variety of mapping functions that can define the deformations discussed herein, as well as other deformations. In general, designing freeform deformations is an under-constrained problem, meaning that a large number of possible deformations can have the desired properties. Following is a description of some of the possible definitions of the deformations heretofore discussed, and are by way of non-limiting example. The definitions are expressed as functions of $\bar{x}$, where $\bar{x}$ is a point in 3D space.

In one embodiment, as the deformation control is moved or modified, the points closest to the deformation control have the greatest movement. That is, the points near the outer boundary of the region of influence move by a lesser amount than the points closer to the deformation control, and points on and beyond the outer boundary of the region of influence do not move at all.

In the following two examples, the function denoted h(t) is used to build a smooth transition from the region near the control where the deformation is maximal to the outer boundary of the region of influence. The function is $C^2$ on its entire domain and is defined as follows:

$$h(t) = \begin{cases} 0, & \text{if } |t| > 1 \\ (1-t^2)^3, & \text{if } |t| \leq 1 \end{cases}$$

A mapping function designed for a point pull operation can be expressed as follows:

$$f(\bar{x}) = \left\{ h\left(\frac{|\bar{x}-\bar{a}|}{R}\right) \right\} \cdot (\bar{B}-\bar{a}) + \bar{x}$$

where
$\bar{a}$ is the position of the deformation control,
$\bar{B}$ is the target point, and
R is the radius of influence.

An example of a mapping function that is implemented in an embodiment to produce a narrowing of a modeled object (i.e., create a neck) can be expressed as follows:

$$f(\bar{x}) = \left\{ \bar{x} - (\bar{x}-\bar{c}, \bar{n}) \cdot \bar{n} + \left(1 + (s-1) \cdot h\left(\frac{(\bar{x}-\bar{c}, \bar{n})}{R}\right)\right) \cdot (\bar{x}-\bar{c}, \bar{n}) - \bar{n} \right\}$$

where
$\bar{c}$ is the center point of the neck feature,
s is a scale factor, and s>0,
R is the radius of influence,
$\bar{n}$ is the unit vector normal to the plane positioned through the center point and such that points of a modeled object are pulled toward the center point along the plane, and
$(\bar{x}-\bar{c}, \bar{n})$ denotes the dot product of the vectors $\bar{x}-\bar{c}$ and $\bar{n}$.

In an embodiment, the mapping function for impressing a spherical feature upon a modeled object can be expressed as follows:

$$f(\bar{x}) = \bar{c} + \left(R + r \cdot g\left(\frac{|\bar{x}-\bar{c}| - R + r}{2r}\right)\right) \cdot \frac{\bar{x}-\bar{c}}{|\bar{x}-\bar{c}|}$$

where
$\bar{c}$ is the center of the sphere acting upon the model,
R is the radius of the sphere,
r is the radius of transition between the impressed sphere and the edge of the radius of influence, and $$g(t) = \begin{cases} 0, & \text{if } t < 0 \\ t^2(2-t), & \text{if } 0 \leq t \leq 1 \\ 2t-1, & \text{if } t > 1 \end{cases}$$

The foregoing expressions of 3D mapping functions are $C^2$ continuous in space, and therefore, $C^2$ continuity of the surface is preserved. Additionally, the foregoing expressions of 3D mapping functions are non-affine 3D mapping functions. Furthermore, the foregoing expressions provide natural-looking shape deformations and permit efficient implementations.

From a user perspective, the deformations described herein are intuitive because each deformation is specified as a deformation to a warp surface while internally the appropriate space deformation (i.e., 3D mapping) is constructed. In one embodiment, the original surface is defined as a parametric surface, s(u, v): $[0,1]^2 \to R^3$, which may possibly be a rectangle. When a mapping f: $R^3 \to R^3$ is applied to the original surface, the new parametric surface can be expressed as $\tilde{s}$(u, v)=f·s(u, v). After n mappings, $f_1, \ldots f_n$, the new parametric surface is the composition of the mappings and the original parametric surface, that is $f_n \circ f_{n-1} \circ \ldots \circ f_1 \circ s(u, v)$. Although the foregoing describes an embodiment utilizing a parametric surface, the original surface can be defined as any type of surface that can be evaluated.

To display the parametric surface and perform other computations on the surface efficiently, a mesh is maintained that approximates the surface. When a new deformation is added to the 3D mapping sequence, the new deformation is applied to the vertices of the mesh to achieve a mesh that approximates the deformed surface. If the mesh is too coarse after the deformation, the surface is evaluated at additional points and the mesh is refined where necessary. A mesh can be generated using techniques such as those described in an article titled "Bubble Mesh: Automated Triangular Meshing of Non-Manifold Geometry by Sphere Packing" by Kenji Shimada and David C. Gossard, Third ACM Symposium on Solid Modeling and Applications, ACM Press 1995, pp. 409-419.

Various modeling operations (e.g., surface intersection, rendering, and mesh refinement), require or may be enhanced by the ability to evaluate first and second derivatives of the surface. In a preferred embodiment, 3D mapping evaluators can handle first and second derivatives. In one embodiment, the chain rule (known by those of ordinary skill in the art for taking the derivative of compositions of functions), is applied to compute exact first and second derivatives of a warp surface at an arbitrary point.

Additional advantages of the present invention include providing the ability to use arbitrary lower-order geometry to control smooth real-time deformations and the efficient disk storage of the model as one or more warp surfaces. The use of lower-order geometry to manipulate a model offers users of the present invention a natural, fast, and simple approach to deforming freeform surfaces. Whereas, storing the model as one or more warp surfaces is not only efficient in terms of storage space, but also because storage as a warp surface enables the accuracy of the model to be maintained.

Figure 9:
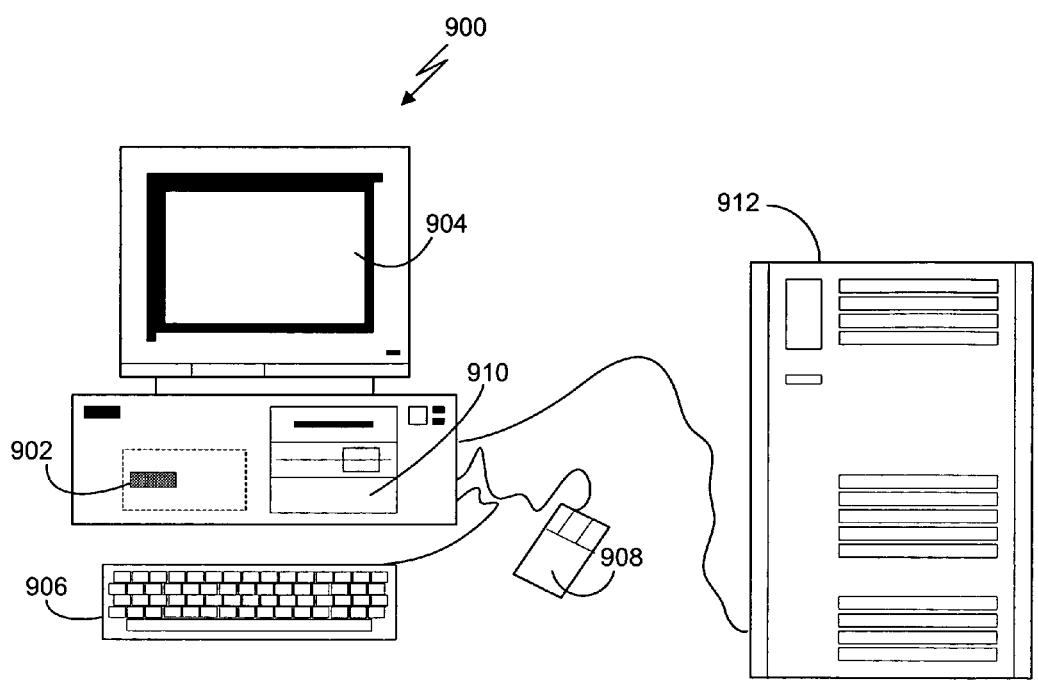
FIG. 9 is a diagram of a computer system.

FIG. 9 shows a computerized modeling system 900 that includes a CPU 902, a CRT 904, a keyboard input device 906, a mouse input device 908, and a storage device 910. The CPU 902, CRT 904, keyboard 906, mouse 908, and storage device 910 can include commonly available computer hardware devices. For example, the CPU 902 can include a Pentium-based processor. The mouse 908 may have conventional left and right buttons that the user may press to issue a command to a software program being executed by the CPU 902. As an alternative or in addition to the mouse 908, the computerized modeling system 900 can include a pointing device such as a trackball, touch-sensitive pad, or pointing device and buttons built into the keyboard 906. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT®, Windows® 98, Windows® 2000, Windows XP®, Windows ME®, UNIX®, Linux®, or MAC OS® operating systems.

Additional computer processing units and hardware devices (e.g., rapid prototyping, video, and printer devices) may be included in the computerized modeling system 900. Furthermore, the computerized modeling system 900 may include network hardware and software thereby enabling communication to a hardware platform 912, and facilitating communication between numerous computer systems that include a CPU and a storage system, among other computer components.

Computer-aided modeling software may be stored on the storage device 910 and may be loaded into and executed by the CPU 902. The modeling software allows a user to create and modify a 3D model, and implements aspects of the invention described herein. The CPU 902 uses the CRT 904 to display a 3D model and other aspects thereof as described. Using the keyboard 906 and the mouse 908, the user can enter and modify data associated with the 3D model. The CPU 902 accepts and processes input from the keyboard 906 and mouse 908. The CPU 902 processes the input along with the data associated with the 3D model and makes corresponding and appropriate changes to that which is displayed on the CRT 904 as commanded by the modeling software. In one embodiment, the modeling software is based on a solid modeling system that may be used to construct a 3D model consisting of one or more solid and surface bodies. Additionally, the modeling software may allow for relationships that parametrically constrain the definitions of one or more bodies or features with respect to one another. If a parametrically constrained relationship exists between two features, a geometric modification to one feature may cause a geometric modification in the other feature.

The invention may be implemented in digital electronic circuitry, or in computer hardware, firmware, software, or in combinations thereof. Apparatus of the invention may be implemented in a computer program product tangibly embodied in a machine-readable storage device (or a computer-readable data storage medium) for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory. Storage devices (or computer-readable data storage medium) suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

A number of embodiments of the present invention have been described. Nevertheless, it will be understood that various modifications may be made without departing from the spirit and scope of the invention. For example, implementations may change the order in which operations are performed. Furthermore, depending on the needs of an implementation, particular operations described herein may be implemented as a combined operation, eliminated, added to, or otherwise rearranged. For example, in FIG. 7, the step defining additional constraints (i.e., step 706) may be eliminated. Moreover, the deformation control may be identified prior to and independent of choosing a deformation operation and one deformation control may be identified for multiple selections of various deformation operations. Likewise, one deformation operation may be chosen while multiple deformation controls are identified.

Furthermore, an implementation may allow for more than one deformation operation to be chosen at a time. In such an implementation, a deformation control may be identified for each chosen deformation operation, and each deformation control may be independently moved and modified. This enables the user to simultaneously establish a number of possible interactions by selecting pairs of deformation operations and a deformation controls.

Accordingly, other embodiments are within the scope of the following claims.

What is claimed is:

1. A computer-implemented method for deforming a three-dimensional computer-generated model to cause a change of shape of the three-dimensional model, the method comprising:

in response to a user directly manipulating a three-dimensional model, deriving a sequence of smooth three-dimensional mapping functions from a functional library that supports user interactive deformation of one or more surfaces, wherein each smooth three-dimensional mapping function defines a deformation and at least one smooth three-dimensional mapping function is non-affine;

constructing a collection of warp surfaces, each warp surface being implemented as a mathematical composition of a respective sequence of smooth three-dimensional mapping functions and a respective original surface definition, wherein the mathematical composition is expressed as $f_n \circ f_{n-1} \circ \ldots \circ f_1 \circ s(u, v)$, where $f_1 \ldots f_n$ represents the respective sequence of smooth three-dimensional mapping functions and $s(u, v)$ represents the respective original surface definition;

using the collection of warp surfaces to represent the three-dimensional model being deformed by the user;
wherein:
for each warp surface, applying the respective sequence of smooth three-dimensional mapping functions to the respective original surface definition, the respective original surface definition being used for each warp surface instead of a changed original surface definition; and
the collection of warp surfaces allows the three-dimensional model to be deformed interactively while maintaining accuracy and precision as the three-dimensional model is deformed by the user;
preserving smoothness to a lowest degree of smoothness of the sequence of smooth three-dimensional mapping functions;
the representing being performed in a storage device such that representation of the three-dimensional model is stored as one or more warp surfaces, each warp surface maintaining accuracy and precision of the three-dimensional model; and
the constructing and using being performed by a processor.

2. A non-transitory computer-readable data storage medium comprising instructions for configuring a computer system to perform the method of claim 1.

3. The computer-implemented method of claim 1, wherein the original surface definition is one of a parametric surface, a mesh surface, and a subdivision surface.

4. The computer-implemented method of claim 1, wherein using the collection of warp surfaces includes for each warp surface, applying the chain rule to the respective sequence of smooth three-dimensional mapping functions.

5. The computer-implemented method of claim 1, further comprising:
displaying a user interface comprised of a plurality of depictions of deformation results; and
selecting one of the plurality of depictions to indicate a deformation operation to be implemented as one mapping function of the respective sequence of smooth three-dimensional mapping functions;
the displaying being performed by a display unit; and
the selecting being performed by an input device.

6. The computer-implemented method of claim 5, wherein the deformation operation when applied with respect to the three-dimensional model achieves one of pulling a curve, pulling a point, pulling an area, impressing a sphere, impressing a curve, narrowing at a specific location, flattening, and twisting.

7. The computer-implemented method of claim 5, further comprising:
identifying a deformation control, the deformation control positioned with respect to the three-dimensional model;
transforming the deformation control such that at least a portion of the deformation control assumes a new location;
utilizing the deformation control as a parameter to the one mapping function of the respective sequence of smooth three-dimensional mapping functions;
the identifying being performed with the input device; and
the transforming and utilizing being performed by the processor.

8. The computer-implemented method of claim 7, wherein the deformation control is a lower-order geometry.

9. The computer-implemented method of claim 7, wherein:
the deformation control is one of a point, a curve, a plane, a line, an axis, an area of a surface, and a parabolic object; and
transforming the deformation control is one of moving the deformation control and modifying the deformation control.

10. The computer-implemented method of claim 7, wherein:
the deformation operation selected is a point-pull operation; and
the deformation control identified is an arbitrary point chosen from the three-dimensional model.

11. The computer-implemented method of claim 7, wherein:
the deformation operation selected is one of a curve-pull operation and a curve-imprint operation; and
the deformation control identified is an arbitrary curve drawn on the three-dimensional model.

12. The computer-implemented method of claim 7, further comprising determining a region of the three-dimensional model influenced by transforming the deformation control, and wherein the region is one of a system-defined region and a user-defined region.

13. The computer-implemented method of claim 12, wherein a user-interface slider control is used to specify the user-defined region.

14. The computer-implemented method of claim 12, wherein the region is utilized as a parameter to the one mapping function of the respective sequence of smooth three-dimensional mapping functions.

15. A non-transitory computer-readable data storage medium comprising instructions for causing a computer to, with respect to one warp surface of a collection of warp surfaces that represents a three-dimensional model:
select a deformation operation to specify a type of modification to the one warp surface;
identify a deformation control for manipulating the one warp surface;
in response to a user directly manipulating the three-dimensional model, derive a first smooth three-dimensional mapping function from a functional library, wherein:
the functional library supports interactive deformation of one or more surfaces;
the first smooth three-dimensional mapping function is a non-affine mapping function selected from the functional library in accordance with the selected deformation operation; and
an attribute of the deformation control is utilized by the first smooth three-dimensional mapping function;
derive a second smooth three-dimensional mapping function from the functional library, wherein:
the second smooth three-dimensional mapping function is one of affine and non-affine;
the second smooth three-dimensional mapping function is selected in accordance with a second deformation operation; and
an attribute of a second deformation control is utilized by the second smooth three-dimensional mapping function; and
store the first and second smooth three-dimensional mapping functions in a data structure representing the one warp surface, wherein the one warp surface being implemented as a mathematical composition of the first smooth three-dimensional mapping function, the second smooth three-dimensional mapping function, and an original surface definition, wherein the mathematical composition is expressed as $f_2 \circ f_1 \circ s(u, v)$, where $f_1$ and $f_2$ represent the first and second smooth three-dimensional mapping functions, respectively, and s(u, v) represents the original surface definition.

16. The non-transitory computer-readable data storage medium of claim 15, wherein the deformation control is one of a point, a curve, a plane, a line, an axis, an area of the one warp surface, and a parabolic object.

17. The non-transitory computer-readable data storage medium of claim 15, further comprising instructions for causing a computer to:
derive a sequence of additional smooth three-dimensional mapping functions; and
update the one warp surface by applying the sequence of smooth three-dimensional mapping functions to the original surface definition;
wherein:
each mapping function in the sequence of smooth three-dimensional mapping functions is an identifiable entity in the data structure representing the one warp surface.

18. A digital computer comprising:
a processor operatively coupled to a data storage system, the data storage system storing a three-dimensional model; and
a data storage memory operatively coupled to the processor and comprising instructions to configure the processor to:
in response to a user directly manipulating a three-dimensional model, derive a sequence of smooth three-dimensional mapping functions from a functional library that supports interactive deformation of one or more surfaces, wherein each smooth three-dimensional mapping function defines a deformation and at least one smooth three-dimensional mapping functions is non-affine;
construct a collection of warp surfaces, each warp surface implements a mathematical composition of a respective sequence of smooth three-dimensional mapping functions and a respective original surface representation, wherein the mathematical composition is expressed as $f_n \circ f_{n-1} \circ \ldots f_1 \circ s(u, v)$, where $f_1 \ldots f_n$ represents the respective sequence of smooth three-dimensional mapping functions and s(u, v) represents the respective original surface definition;
use the collection of warp surfaces to represent the three-dimensional model being deformed by the user, the collection of warp surfaces allowing the three-dimensional model to be deformed interactively while maintaining accuracy and precision as the three-dimensional model is deformed by the user; and
for each warp surface, apply the respective sequence of smooth three-dimensional mapping functions to the respective original surface representation while preserving smoothness to a lowest degree of smoothness of the sequence of smooth three-dimensional mapping functions, the respective original surface representation being used for each warp surface instead of a changed original surface representation, and each warp surface maintaining accuracy and precision of the three-dimensional model.

19. The digital computer of claim 18 further comprising instructions to configure the processor to:
specify a deformation control;
transform the deformation control by one of moving and modifying the deformation control;
with respect to one warp surface of the collection of warp surfaces, derive a modified version of a smooth three-dimensional mapping function added last to the respective sequence for application to the original surface representation, the modified version based upon the transformed deformation control; and
replace the smooth three-dimensional mapping function added last to the respective sequence with the modified version of the smooth three-dimensional mapping function.

20. The digital computer of claim 19, wherein the deformation control is one of a point, a curve, a plane, a line, an axis, an area of the one warp surface, a parabolic object, and a three-dimensional enclosure object.

21. The digital computer of claim 18, further comprising instructions to configure the processor to display a user interface containing a plurality of icons, wherein each icon depicts a result of one of a plurality of deformation operations and each one of the plurality of deformation operations indicates one of the smooth three-dimensional mapping functions in the functional library to derive.

* * * * *